(12) United States Patent
Tsuchiya et al.

(10) Patent No.: US 8,182,944 B2
(45) Date of Patent: *May 22, 2012

(54) COMPOSITE PARTICLES FOR ELECTROCHEMICAL ELEMENT ELECTRODE

(75) Inventors: Fumiaki Tsuchiya, Tokyo (JP); Mayumi Fukumine, Tokyo (JP)

(73) Assignee: Zeon Corporation, Tokyo (JP)

(*) Notice: Subject to any disclaimer, the term of this patent is extended or adjusted under 35 U.S.C. 154(b) by 1168 days.

This patent is subject to a terminal disclaimer.

(21) Appl. No.: 11/919,347

(22) PCT Filed: Apr. 26, 2006

(86) PCT No.: PCT/JP2006/308749
§ 371 (c)(1),
(2), (4) Date: Jan. 11, 2008

(87) PCT Pub. No.: WO2006/115272
PCT Pub. Date: Nov. 2, 2006

(65) Prior Publication Data
US 2009/0325075 A1  Dec. 31, 2009

(30) Foreign Application Priority Data

Apr. 26, 2005  (JP) .................................. 2005-128438

(51) Int. Cl.
*H01M 4/13* (2010.01)

(52) U.S. Cl. ........................................ 429/232; 429/217

(58) Field of Classification Search ........... 429/209–246
See application file for complete search history.

(56) References Cited

U.S. PATENT DOCUMENTS

| | | | |
|---|---|---|---|
| 5,567,539 A * | 10/1996 | Takahashi et al. | 429/57 |
| 5,905,004 A * | 5/1999 | Sakai et al. | 429/232 |
| 2003/0003360 A1 * | 1/2003 | Gorkovenko et al. | 429/213 |
| 2005/0058907 A1 * | 3/2005 | Kurihara et al. | 429/232 |
| 2005/0064069 A1 | 3/2005 | Adams | |
| 2005/0064289 A1 | 3/2005 | Suzuki et al. | |
| 2005/0285080 A1 | 12/2005 | Suzuki et al. | |

FOREIGN PATENT DOCUMENTS

| | | |
|---|---|---|
| JP | 9-289142 A | 11/1997 |
| JP | 2000-040504 A | 2/2000 |
| JP | 2003-224039 A | 8/2003 |
| JP | 2003-303588 A | 10/2003 |
| JP | 2005-026191 A | 1/2005 |
| JP | 2005-78943 A | 3/2005 |
| JP | 2005-276609 A | 10/2005 |
| WO | WO-2004/064092 A1 | 7/2004 |

* cited by examiner

*Primary Examiner* — Patrick Ryan
*Assistant Examiner* — Muhammad Siddiquee
(74) *Attorney, Agent, or Firm* — Birch, Stewart, Kolasch & Birch, LLP

(57) ABSTRACT

The present invention provides a method of producing composite particle for high density electrochemical element electrodes in electrochemical elements having low internal resistance and high capacitance.

Slurry containing an electric conductive material and a binder is obtained, and the slurry is sprayed to a fluidized electrode active material to carry out fluidized-granulation, and further particles obtained by the fluidized-granulation are rolling-fluidized granulated, and thereby, composite particle for electrochemical element electrode, containing electrode active materials, electric conductive materials, and binders, and being structured of an outer layer portion (outer shell portion) and an inner layer portion (core portion), where the outer shell portion and the core portion are made by bonding the electrode active material and the electric conductive material by the binder, and the weight average particle diameter of the electrode active material and the electric conductive material which form the outer shell portion is smaller than the weight average particle diameter of the electrode active material and the electric conductive material which form the core portion are obtained.

9 Claims, 3 Drawing Sheets

[FIG.1]
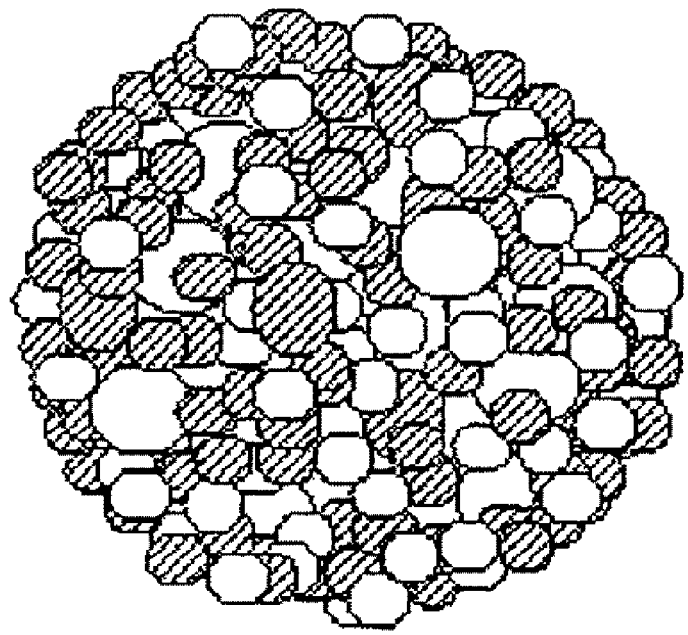
[FIG.2]
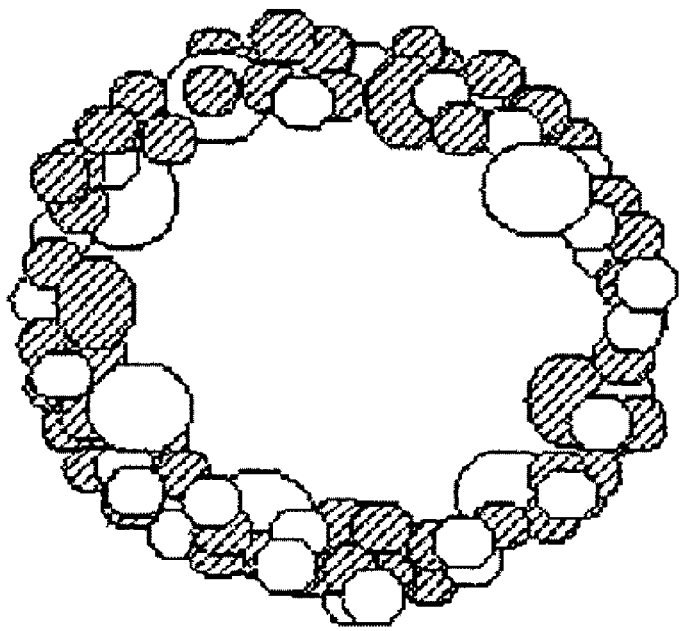

[FIG. 3]
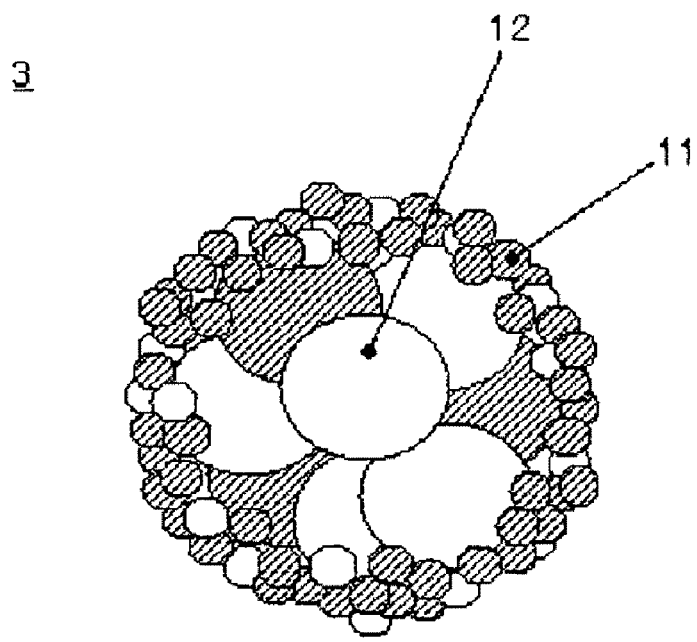
[FIG. 4]
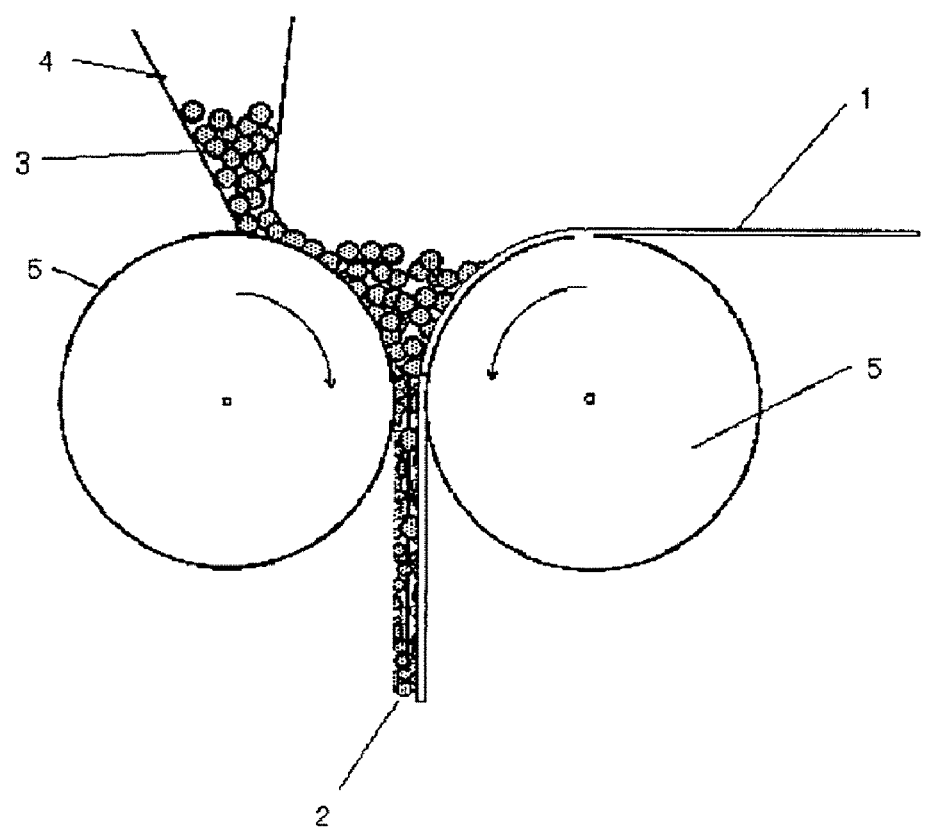

[FIG. 5]
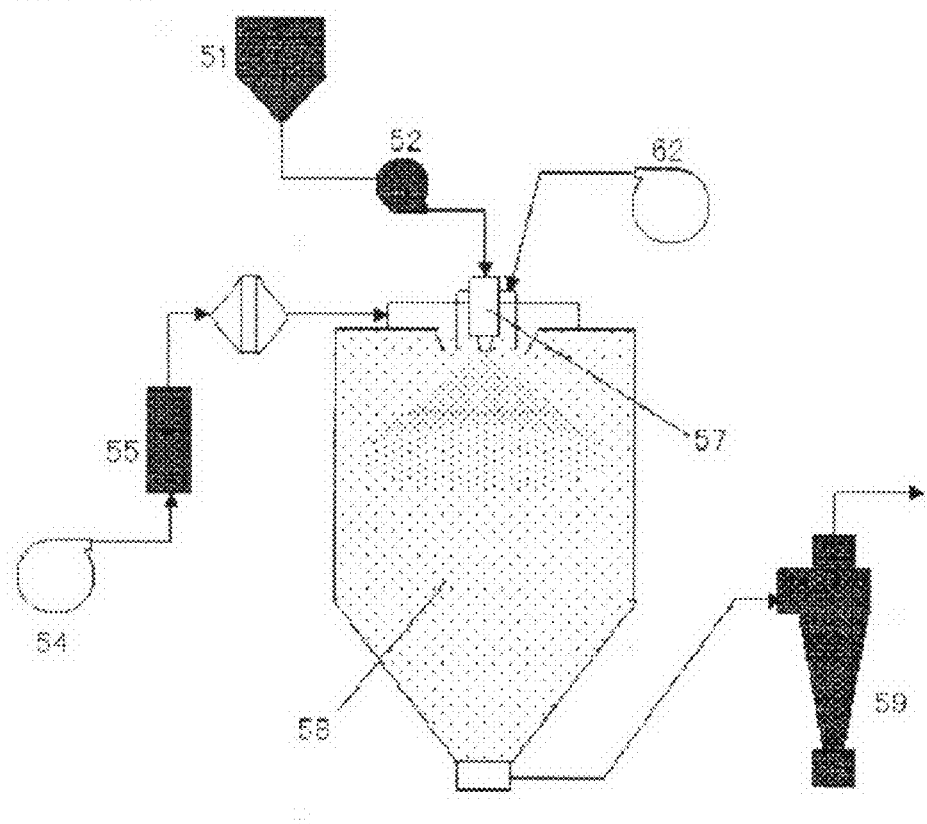
[FIG. 6]
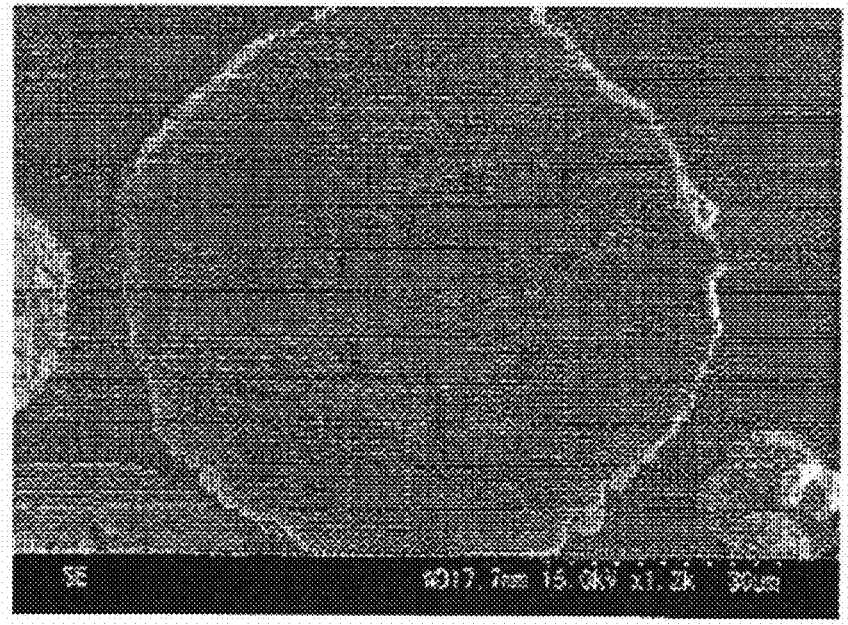

COMPOSITE PARTICLES FOR ELECTROCHEMICAL ELEMENT ELECTRODE

TECHNICAL FIELD

The present invention relates to composite particles which constitute an electrode material used preferably for electrochemical elements such as a lithium ion secondary battery and an electric double layer capacitor, in particular an electric double layer capacitor (in the present specification, referred to simply as "composite particles") Further, the present invention relates to an electrode material comprising the composite particles, and an electrochemical element electrode using the electrode material.

BACKGROUND ART

Electrochemical elements such as a lithium ion secondary battery and an electric double layer capacitor have advantageous characteristics that they are small, lightweight, their energy density is high, and they can be repeatedly charged and discharged, and accordingly their demand is expanding rapidly. The lithium ion secondary battery has a relatively large energy density, and it is used in the fields such as cellular phones and notebook personal computers, meanwhile the electric double layer capacitor can be rapidly charged and discharged, and it is used as a memory backup small power source in personal computers and the like. Furthermore, the electric double layer capacitor is expected to be applied as a large sized power source for electric vehicles. Moreover, the redox capacitor using the oxidation-reduction reaction (pseudo electricity double layer capacitance) on the surface of a metal oxide or a conductive polymer also attracts attention because of the size of its capacitance. As for these electrochemical elements, along with the expansion of their applications, further more improvements are required for lower resistance, higher capacitance, more excellent mechanical properties and the like. Under such circumstances, in order to enhance the performances of electrochemical elements, various improvements are also made in the materials which form electrochemical element electrodes.

The electrochemical element electrodes are, in general, made by laminating active material layers which are formed by bonding electrode active materials such as activated carbon and lithium metal oxide, and electric conductive materials on a collector.

Patent Documents 1 and 2 disclose a method of pressurizing and forming composite particles obtained by bonding particulate electrode active materials and particulate electric conducting auxiliary agents by a binder to obtain active material layers. The composite particles used in the Patent Documents 1 and 2 have the structure where particulate electrode active materials and particulate electric conducting auxiliary agents are distributed uniformly in the composite particles as shown in FIG. 1. However, the composite particles have inferior formability, and accordingly, it has been difficult to obtain electrode sheets stably and continuously.

Further, Patent Documents 3 discloses a method where a slurry mixed material containing electrode active materials, thermosetting resin, and solvent is formed, and this mixed material is granulated by the spray dry method to obtained composite particles, and the composite particles are fixed by the hot pressing, roll pressing, or other means on a collector to form active material layers. The particles obtained in the Patent Documents 3 are, as shown in FIG. 2, hollow particles having the husks formed with bonded particulate electrode active materials.

However, in the electrodes formed of these particles, the density of its active material layers is low, and accordingly, only electrochemical elements with small capacitance have been obtained.

[Patent Document 1] Japanese Unexamined Patent Application Publication No.2005-78943
[Patent Document 2] United States Patent Publication No. 2005/0064069
[Patent Document 3] Japanese Unexamined Patent Application Publication No. H09-289142

DISCLOSURE OF THE INVENTION

Problems to be Solved by the Invention

The object of the present invention is to provide composite particles for electrochemical element electrodes for obtaining electrochemical elements having both low internal resistance and high capacitance, electrode materials comprising the composite particles, and electrodes formed by the electrode materials.

Means to Solve the Problems

The present inventors have made examinations wholeheartedly in order to attain the above object, as a result, the present inventors have found that the internal resistance of the electrochemical element becomes low and the capacity becomes large and the electrode density becomes high, by forming an active material layer on a collector using electrode materials comprising composite particles for electrochemical element electrodes which comprises electrode active materials, electric conductive materials and binders, and being structured of an outer layer portion (outer shell portion) and an inner layer portion (core portion), where the outer shell portion and the core portion are made by bonding the electrode active materials and the electric conductive materials by the binders, and the weight average particle diameter of, the electrode active material and the electric conductive material which form the outer shell portion, is smaller than the weight average particle diameter of, the electrode active material and the electric conductive material which form the core portion. The present inventors have come to complete the present invention on the basis of the above findings.

According to the present invention, there are provided composite particles for electrochemical element electrodes, comprising electrode active materials, electric conductive materials, and binders, and being structured of an outer layer portion (outer shell portion) and an inner layer portion (core portion), where the outer shell portion and the core portion are made by bonding the electrode active material and the electric conductive material by the binder, and the weight average particle diameter of the electrode active material and the electric conductive material which form the outer shell portion is smaller than the weight average particle diameter of the electrode active material and the electric conductive material which form the core portion.

Moreover, according to the present invention, there are provided an electrochemical element electrode material comprising the above composite particles for electrochemical element electrodes, and an electrochemical element electrode where an active material layer made of the electrochemical element electrode material is laminated on a collector.

Furthermore, according to the present invention, there are provided a method of producing composite particles for electrochemical element electrodes comprising steps of:

obtaining slurry A containing an electric conductive material and a binder, fluidizing an electrode active material and fluidized-granulating by spraying the above slurry A thereto, and rolling-fluidized granulating the particles obtained in the fluidized-granulating step in the presense of slurry A; and a method of producing composite particles for electrochemical element electrodes comprising the steps of:

obtaining slurry B containing an electrode active material, an electric conductive material and a binder, and spray-granulating by spray-drying the above slurry B with a pin type atomizer.

EFFECTS OF THE INVENTION

Composite particles for electrochemical element electrodes according to the present invention have a structure where an electrode active material and an electric conductive material (mainly electric conductive material) whose weight average particle diameter is comparatively small are distributed in the outer layer portion (outer shell portion), and an electrode active material and an electric conductive material (mainly electrode active material) whose weight average particle diameter is comparatively large are distributed in the inner layer portion (core portion). In the electrode obtained using this composite particle, the internal resistance becomes low. Moreover, the core portion is occupied by particles having a large particle diameter, and accordingly, a lot of fine pores are distributed, and it has a structure where electrolysis solution permeates easily, and large electric capacitance can be obtained. Further, the electrode for electrochemical elements obtained using the electrochemical element electrode material comprising the composite particles can be used for electrochemical elements which can perform storage and conversion of energy.

BRIEF DESCRIPTION OF THE DRAWINGS

FIG. 1 is a sectional view showing a composite particle of the prior art.

FIG. 2 is a sectional view showing a composite particle of the prior art.

FIG. 3 is a sectional view showing an example of a composite particle of the present invention.

FIG. 4 is a figure showing an example of a method of producing an electrode.

FIG. 5 is a figure showing an example of the spray-drying apparatus used in the present Example.

FIG. 6 is a figure showing the electron microscope observation image of the cross sectional view of a composite particle obtained in Example 1.

BEST MODE FOR CARRYING OUT THE INVENTION

Composite particle for electrochemical element electrode according to the present invention has a structure comprising electrode active material, electric conductive material, and binder, and being structured of an outer layer portion (outer shell portion) and an inner layer portion (core portion), where the outer shell portion and the core portion are made by bonding the electrode active material and the electric conductive material by the binder, and the weight average particle diameter of the electrode active material and the electric conductive material which form the outer shell portion is smaller than the weight average particle diameter of the electrode active material and the electric conductive material which form the core portion.

The electrode active material which makes up the composite particle of the present invention is suitably chosen according to the type of electrochemical elements. As the electrode active material for the positive electrode of a lithium ion secondary battery, lithium-containing compound metal oxides such as $LiCoO_2$, $LiNiO_2$, $LiMnO_2$, $LiMn_2O_4$, $LiFePO_4$, $LiFeVO_4$; transition metal sulfides such as $TiS_2$, $TiS_3$, amorphous $MoS_3$; transition metal oxides such as $Cu_2V_2O_3$, amorphous $V_2O.P_2O_5$, $MoO_3$, $V_2O_5$, $V_6O_{13}$; may be examplified. Furthermore, conductive polymers such as polyacetylene and poly-p-phenylene may be mentioned.

As the electrode active material for the negative electrode of a lithium ion secondary battery may be mentioned, for example, carbonaceous materials such as amorphous carbon, graphite, natural graphite, meso carbon micro bead (MCMB), and pitch based carbon fiber; conductive polymers such as polyacene. These respective electrode active materials may be used alone or in combination of two or more, according to the type of electrochemical elements. When the electrode active materials are used in combinations, two or more kinds of electrode active materials having different average particle diameters or particle diameter distributions may be used in combination.

It is preferable that the shape of the electrode active material used for the electrode of a lithium ion secondary battery is granulated into spherical particles. If the shape of particles is spherical, a high density electrode can be formed when the electrode is formed. Moreover, mixture of fine particles with an average particle diameter of about 1 μm and comparatively large particles with an average particle diameter from 3 to 8 μm, or particles having a broad particle diameter distribution from 0.5 to 8 μm are preferable. It is preferable that in case of use, particles with diameter of 50 μm or larger are eliminated by screening and the like. Although the tap density specified by ASTM D4164 of electrode active material is not restricted in particular, one of 2 $g/cm^3$ or more is used preferably in the positive electrode, and one of 0.6 $g/cm^3$ or more is preferably used in the negative electrode.

As the electrode active material for electric double layer capacitors, usually, a carbonaceous material is used. It is preferable that the electrode active material for electric double layer capacitors has a large specific surface area enough to form an interface of a larger area even with a same weight. In particular, it is preferable that the specific surface area is 30 $m^2/g$ or more, preferably from 500 $m^2/g$ to 5,000 $m^2/g$, further preferably from 1,000 $m^2/g$ to 3,000 $m^2/g$. As specific examples of the carbonaceous materials, activated carbon, polyacene, carbon whisker, graphite, and the like may be mentioned, and powder or fibers of these can be used. A preferable electrode active material for electric double layer capacitors is activated carbon, and specifically, activated carbon made from phenol, rayon, acryl, pitch, or coconut husk may be listed up. As the electrode active material for electric double layer capacitors, these respective carbonaceous materials may be used alone or in combination of two or more. When the carbonaceous materials are used in combination, two or more kinds of carbonaceous materials having different average particle diameters or particle diameter distributions may be used in combination.

Moreover, non-porosity carbon that has micro crystallite carbon similar to graphite and the interlayer distance between layers of the micro crystallite carbon is expanded may be used as the electrode active material. Such non-porosity carbon is obtained by dry-distilling graphitizable carbon with developed micro crystallite of multilayer graphite structure from 700° C. to 850° C., subsequently heat treating it with a caustic alkali from 800° C. to 900° C., and further removing residual alkali ingredient with heated steam at necessity.

As the electrode active material for electric double layer capacitors, when powder whose weight average particle diameter is from 0.1 µm to 100 µm, preferably from 1 µm to 50 µm, further preferably from 5 µm to 20 µm is used, it is possible to easily make thin film-shape electrode for electric double layer capacitors, and to make the electric capacity high, which is preferable.

The electric conductive material which makes up the composite particles according to the present invention is a particulate carbon material which has conductivity, and does not have fine pores which can form an electric double layer, and is to increase the conductivity of an electrochemical element electrode. The weight average particle diameter of the electric conductive material is smaller than the weight average particle diameter of the electrode active material, and is in the range usually of 0.001 µm to 10 µm, preferably 0.05 µm to 5 µm, further preferably 0.01 µm to 1 µm. When the weight average particle diameter of the electric conductive material is in this range, high conductivity may be provided for the electrochemical element electrode by a smaller used amount. In particular, conductive carbon black such as furnace black, acetylene black, and KETJEN BLACK (registered trademark of Aczo Nobel Chemicals B.V.); and graphite such as natural graphite and artificial graphite; may be employed. Also in these, conductive carbon black is preferable, and acetylene black and furnace black are further preferable. These respective electric conductive materials may be used alone or in combination of two or more.

The amount of the electric conductive material to 100 parts by weight of the electrode active material is usually in the range of 0.1 part to 50 parts by weight, preferably 0.5 part to 15 parts by weight, and further preferably 1 part to 10 parts by weight. By using the electrode whose electric conductive material quantity is in this range, it is possible to make the capacity of an electrochemical element high and make the internal resistance low.

The binder used in the present invention is not limited in particular so long as it is a compound which has bonding ability, meanwhile a dispersible binder is preferable. The dispersible binder is a binder with the character to be dispersed in a solvent. For example, high molecular compounds such as fluoride polymer, diene polymer, acrylate polymer, polyimide, polyamide, polyurethane and so on may be mentioned, and further preferably, fluoride polymer, diene polymer, and acrylate polymer may be mentioned. These respective binders may be used alone or may be used in combination of two or more.

The fluoride polymer is a polymer containing a monomer units containing a fluorine atom. The amount of the monomer unit containing the fluorine in the fluoride polymer is usually 50% by weight or more. As examples of the fluoride polymer, fluororesins such as polytetrafluoroethylene, and polyvinylidenefluoride may be used, and polytetrafluoroethylene is preferable.

The diene polymer is a polymer including a monomer unit derived from conjugated diene such as butadiene, isoprene and so on and hydrogenated product thereof. The amount of the monomer unit derived from conjugated diene in the diene polymer is usually 40% by weight or more, preferably 50% by weight or more, and further preferably 60% by weight or more. Specifically, conjugated diene homo-polymers such as polybutadiene, polyisoprene; aromatic vinyl-conjugated diene copolymers such as styrene butadiene copolymer (SBR) which may be carboxy-modified; vinyl cyanide and conjugated diene copolymer such as acrylonitrile butadiene copolymers (NBR); hydrogenated SBR, hydrogenated NBR, and the like may be listed up.

The acrylate polymer is a polymer including a monomer unit derived from acrylic acid ester and/or methacrylic acid ester. The amount of the monomer unit derived from acrylic acid ester and/or methacrylic acid ester in the acrylate polymer is usually 40% by weight or more, preferably 50% by weight or more, and further preferably 60% by weight or more. As specific examples of the acrylate polymer may be mentioned cross-linked acrylate polymers such as copolymer of 2-ethylhexyl acrylate, methacrylic acid, acrylonitrile and ethyleneglycol dimethacrylate, copolymer of 2-ethylhexyl acrylate, methacrylic acid, methacrylonitrile and diethyleneglycol dimethacrylate, copolymer of 2-ethylhexyl acrylate, styrene, methacrylic acid and ethyleneglycol dimethacrylate, copolymer of butyl acrylate, acrylonitrile and diethyleneglycol dimethacrylate, and copolymer of butyl acrylate, acrylic acid and trimethylolpropane tri-methacrylate; copolymers of ethylene and acrylic (or methacrylic) acid ester such as copolymer of ethylene and methyl acrylate, copolymer of ethylene and methyl methacrylate, copolymer of ethylene and ethyl acrylate, and copolymer of ethylene and ethyl methacrylate; and graft polymers where a radical polymerizable monomer is grafted to the above copolymer of ethylene and acrylic (or methacrylic) acid ester. Note that, as the radical polymerizable monomer used for the above graft polymers, methyl methacrylate, acrylonitrile, methacrylic acid, and the like may be mentioned. In addition, copolymer of ethylene and acrylic (or methacrylic) acid such as copolymer of ethylene and acrylic acid, copolymer of ethylene and methacrylic acid and the like may be used as the binder.

Among these, the diene polymer and the cross-linked acrylate polymer are preferable, and the cross-linked acrylate polymer is in particular preferable, from the viewpoints that they can obtain an active material layer excellent in bonding property with a collector and surface smoothness, moreover, they enable to produce electrodes for electrochemical elements with high electric capacity and low internal resistance.

Although the binder used for the present invention is not limited in particular as for the shape, it is preferable that the binder is particulate since its bonding property is good, and the decline of the electric capacity of produced electrodes and the deterioration thereof by the repetition of charge and discharge can be restrained. As the particulate binder, for example, one in the state where the particles of the binder are dispersed in the solvent like Latex, and powdered one obtained by drying such dispersed liquid may be employed.

Moreover, the binder used in the present invention may be particles which have a core-shell structure obtainable by stepwise-polymerizing two or more kinds of monomer mixtures. It is preferable that the binder which has the core-shell structure is obtained by first polymerizing the monomer that gives the first polymer to obtain a seed particle, and polymerizing the monomer that gives the second polymer in the presence of the seed particle.

Although the ratio or the core and the shell of the binder having the above core-shell structure is not limited in particular, the ratio of core portion:shell portion in mass is usually from 50:50 to 99:1, preferably from 60:40 to 99:1, and further preferably from 70:30 to 99:1. The high molecular compound which makes up the core portion and the shell portion may be chosen from the above high molecular compounds. As for the core portion and the shell portion, it is preferable that one of these has a glass transition temperature below 0° C., and, the other has a glass transition temperature of 0° C. or higher.

Moreover, the difference of the glass transition temperature of the core portion and the shell portion is usually 20° C. or higher, and preferably 50° C. or higher.

Although the average particle diameter of the particulate binder used in the present invention is not limited in particular, it is usually from 0.0001 µm to 100 µm, preferably from 0.001 µm to 10 µm, and further preferably from 0.01 µm to 1 µm. When the average particle diameter of the binder is in this range, it is possible to give excellent bonding force even by use of a small amount of binder to the active material layer. Herein, the average particle diameter is the number average particle diameter which is calculated as the arithmetic average value of measured diameters of 100 binder particles chosen at random by use of a transmission electron microscope photograph. The shape of the particles may be either spherical or irregular.

The used amount of this binder to 100 parts by weight of the electrode active material is in the range of usually 0.1 to 50 parts by weight, preferably 0.5 to 20 parts by weight, and further preferably 1 to 10 parts by weight.

As for the composite particles according to the present invention, when a dispersible binder is used as the binder, it is preferable that it further contains soluble resin. This soluble resin is a resin which dissolves in solvent and further preferably has the function to assist the electrode active material, the electric conductive material, and the like to be dispersed uniformly in the solvent. The soluble resin may have or may not have bonding ability. As the soluble resin may be mentioned cellulose polymers such as carboxymethyl cellulose, methyl cellulose, ethyl cellulose and hydroxypropyl cellulose, and ammonium salt or alkaline metal salt of these; salts of poly acrylic (or methacrylic) acid such as poly sodium acrylate (or methacrylate); polyvinyl alcohol, modified polyvinyl alcohol, polyethylene oxide; poly vinyl pyrrolidone, polycarboxylic acids, starch oxide, starch phosphate, casein, various denatured starches, a chitin, chitosan derivatives, and the like. These respective soluble resins may be used alone or may be used in combination of two or more. In particular, cellulose polymers are preferable, and carboxymethyl cellulose or its ammonium salt or alkaline metal salt is in particular preferable. Although the used amount of the soluble resin is not limited in particular, the used amount to 100 parts by weight of the electrode active material is in the range of usually 0.1 to 10 parts by weight, preferably 0.5 to 5parts by weight, and further preferably 0.8 to 2 parts by weight. By using the soluble resin, sedimentation and condensation of the solid contents in slurry can be restrained. Moreover, since clogging of the atomizer at the moment of spray-drying can be prevented, it is possible to perform the spray-drying stably and continuously.

The composite particles according to the present invention may contain further other additives at necessity. As other additives, for example, there are surface active agents. As the surface active agents are mentioned anionic surface active agents, cationic surface active agents, nonionic surface active agents, and ampholytic surface active agents such as non-ionic-anionic surface active agents, meanwhile, anionic or nonionic surface active agents that are easily thermally decomposed are especially preferable. The used amount of the surface active agent is not limited in particulate, but the used amount thereof to 100 parts by weight of the electrode active material is in the range of 0 to 50 parts by weight, preferably 0.1 to 10 parts by weight, and further preferably 0.5 to 5 parts by weight.

The composite particles according to the present invention are structured of an outer layer portion (outer shell portion) and an inner layer portion (core portion), and both of the outer shell portion and the core portion are made by bonding the above electrode active material and the electric conductive material by the binder, and the weight average particle diameter of the electrode active material and the electric conductive material which form the outer shell portion is smaller than the weight average particle diameter of the electrode active material and the electric conductive material which form the core portion. FIG. 3 is a figure schematically showing the cross sectional view of a composite particle 3 according to the present invention.

The outer layer portion (outer shell portion) of the composite particle is formed by bonding electrode active materials 12 and/or electric conductive materials 11 whose weight average particle diameter is comparatively small. Therefore, it is dense and has few unfilled portions.

On the other hand, the inner layer portion (core portion) of the composite particle is formed by bonding electrode active materials 12 and/or electric conductive materials 11 whose weight average particle diameter is comparatively large. Since it is formed of the materials whose weight average particle diameter is comparatively large, unfilled portions between electrode active materials and/or electric conductive materials are large. That the composite particle is structured of the outer layer portion (outer shell portion) and the inner layer portion (core portion), and the weight average particle diameter of the electrode active material and the electric conductive material which form the outer shell portion is smaller than the weight average particle diameter of the electrode active material and the electric conductive material which form the core portion can be determined easily by observing an electron microscopic picture of the cross section of the composite particle.

As described above, when electric conductive materials smaller than the electrode active materials are used, many electric conductive materials are distributed in the composite particle outer layer portion (outer shell portion), and many electrode active materials are distributed in composite particle inner layer portion (core portion). When many electric conductive materials are distributed in the outer shell portion, the conductivity of the surface of the composite particle becomes high. It is thought that since composite particles contact mutually on the surface when the active material layers are formed, it becomes easy to pass along electricity, and resistance becomes low. Moreover, it is thought that since there are many unfilled portions which pass to many electrode active materials distributed in the core portion, the migrating of ion becomes well, therefore it is surmised that the capacitance becomes high.

The weight average particle diameter of the composite particles according to the present invention is in the range of usually 0.1 µm to 1000 µm, preferably 5 µm to 500 µm, and further preferably is 10 µm to 100 µm.

Although the producing method of the composite particles for electrochemical element electrodes according to the present invention is not limited in particular, the following two producing methods are preferable, and the composite particles may be easily obtained by these.

The first producing method comprises a step of obtaining slurry A containing electric conductive materials, a binder, and soluble resin and other additives to be added at necessity, a step of fluidizing the electrode active material and fluidized-granulating by spraying the slurry A thereto, and a step of rolling-fluidized granulating the particles obtained in the above fluidized-granulating step.

First, the slurry A which comprises electric conductive materials, a binder, and soluble resin and other additives to be added at necessity is obtained. As the solvent used in order to obtain the slurry A, in general, water is used preferably, organic solvent may also be used. As the organic solvent, for example, alkyl alcohols such as methyl alcohol, ethyl alcohol, propyl alcohol; alkyl ketones such as acetone, methyl ethyl ketone; ethers such as tetrahydrofuran, dioxane, diglyme; amides such as diethyl formamide, dimethyl acetamide, N-methyl-2-pyrrolidone (hereinafter referred to as NMP), dimethyl imidazolidinone; sulfur-containing solvents such as dimethyl sulfoxide, sulfolane; may be mentioned. Of these, alcohols are preferable. If an organic solvent whose boiling point is lower than that of water is used in combination with water, the drying can be made fast at the time of fluidized-granulation. Moreover, since the dispersibility of the binder or the solubility of the soluble resin changes, and the viscosity and flowability of the slurry A may be adjusted by the quantity or the type of the organic solvent, it is possible to improve the producing efficiency.

The amount of the solvent used in preparing the slurry A is such that the solid content concentration of the slurry A is usually in the range of 1% to 50% by weight, preferably 5% to 50% by weight, and further preferably 10% to 30% by weight. When the solid content concentration is in this range, the binder disperses uniformly, which is preferable.

The method or procedure to disperse or dissolve the above electric conductive material and the binder, and the soluble resin at necessity in the solvent is not limited in particular. For example, the method of adding the electric conductive material, the binder, and the soluble resin into the solvent to mix them; the method of dissolving the soluble resin in the solvent and adding the binder (for example, Latex) dispersed in the solvent to mix them, and finally adding the electric conductive material to mix them; the method of adding the electric conductive material into the soluble resin dissolved in the solvent to mix them and adding the dispersible binder dispersed in the solvent into them to mix them; and the like may be mentioned. As means for mixing, for example, mixer machines such as a ball mill, a sand mill, a bead mill, a pigment dispersion machine, a crushing machine, an ultrasonic dispersion machine, a homogenizer, a planetary mixer may be mentioned. The mixing is usually performed in the range of room temperature to 80° C., and for 10 minutes to several hours.

Next, the electrode active material is fluidized, and the above slurry A is sprayed thereto, and fluidized-granulation is performed. The fluidized-granulation method includes a method by a fluidized bed, a method by a modified fluidized bed, a method by a spouted bed, and the like. The method by a fluidized bed is one of fluidizing the electrode active material by a hot wind, and atomizing the above slurry A to this from a spray and the like to perform agglomeration and granulation. The method by a modified fluidized bed is same as the method by a fluidized bed, except that it is a method of giving a circulation flow to the powder in the bed, and of taking those granulated matters out which grow comparatively large by using the classifying effect.

Moreover, the method by a spouted bed is one of adhering the slurry A from a spray and the like to coarse particles by use of the feature of a spouted bed to dry and granulate them simultaneously. As the process of the present invention, among these three methods, the method by a fluidized bed or the method by a modified fluidized bed are preferable.

Although the temperature of the slurry to be sprayed is usually at the room temperature, but it may be warmed to higher than the room temperature. The temperature of the hot wind used for fluidization is usually from 80° C. to 300° C., and preferably from 100° C. to 200° C.

Although the particles A obtained by the fluidized-granulation may be completely dried by a hot wind, meanwhile in order to increase the granulation efficiency in the following rolling-fluidized granulating process, particles in a wet condition are preferable.

Subsequently, the particles A obtained at the above fluidized-granulation process is rolling-fluidized granulated in the presence of the slurry A containing the electric conductive material and the binder. In addition, if the slurry A used for the rolling-fluidized granulation contains the electric conductive material and the binder, it may be same as or different from the slurry A used in the fluidized-granulation. The rolling-fluidized granulation method include a rotary plate method, a rotary cylinder method, a rotary head cut cone method and the like. The rotary plate method is a method where the above slurry A is sprayed to the particles A supplied in an inclined rotating plate to generate agglutinated granulated matters, and those granulated matters which grow comparatively large are taken out from a rim by use of the classifying effect of the rotary plate. The rotary cylinder method is a method where wet particles A are supplied to the inclined rotating cylinder, and rolled in the cylinder, and the above slurry A is sprayed thereto to obtain agglutinated granulated matters. The rotary head cut cone method is same as the operation system of the rotary cylinder method, except that it is a method where those granulated matters which grow comparatively large are taken out by use of the classifying effect of the agglutinated granulated matters from the head cut cone. In this rolling-fluidized granulation step, covering granulation is mainly performed, and agglutinated granulation is performed partly.

Although the temperature at the time of rolling-fluidized granulation is not limited in particular, in order to remove the solvent which constitutes the slurry A, the temperature is usually from 80° C. to 300° C., an preferably from 100° C. to 200° C. Furthermore, in order to remove the residual solvent from the composite particles, they may be dried at necessity after the rolling-fluidized granulation.

By the above method, the composite particle comprising the electrode active material, the electric conductive material, and the binder is obtained. In this composite particle, the electrode active material and the electric conductive material are bonded by the binder and/or the soluble resin, and the outer shell portion of the composite particle is formed by bonding the electrode active material and/or the electric conductive material whose weight average particle diameters are comparatively small, and the core portion of the composite particle is formed by bonding the electrode active material and/or the electric conductive material whose weight average particle diameters are comparatively large.

The second producing method includes a step of obtaining slurry B containing the electrode active material, the electric conductive material, and the binder, and a step of spray-drying the above slurry B by a pin type atomizer to spray-granulate it.

First, the above electrode active material, the electric conductive material, the binder, and soluble resin and other additives at necessity are dispersed or dissolved in a solvent to obtain the slurry B which the above electrode active material, the electric conductive material, the binder, and soluble resin and other additives at necessity are dispersed or dissolved.

As the solvent used in order to obtain the slurry B, those same as listed in the above first producing method may be employed. The amount of the solvent used in preparing the slurry B is such that the solid content concentration of the slurry B is usually in the range of 1% to 50% by weight, preferably 5% to 50% by weight, and further preferably 10% to 30% by weight.

The method or procedure to disperse or dissolve the above electrode active material, the electric conductive material, the binder, and the soluble resin and other additives at necessity in the solvent is not limited in particular. For example, the method of adding the electrode active material, the electric conductive material, the binder, and the soluble resin in the solvent to mix them; the method of dissolving the soluble resin in the solvent, and adding the binder (for example, Latex) dispersed in the solvent to mix them, and finally adding the electrode active material and the electric conductive material to mix them; the method of adding the electrode active material and the electric conductive material to the binder dispersed in the solvent, and adding the soluble resin dissolved in the solvent to mix them, and the like may be mentioned. As means for mixing, for example, mixer machines such as a ball mill, a sand mill, a bead mill, a pigment dispersion machine, a crushing machine, an ultrasonic disperse machine, a homogenizer, a planetary mixer may be mentioned. The mixing is usually performed in the range of room temperature to 80° C., and for 10 minutes to several hours.

Next, the above slurry B is spray-dried by a pin type atomizer, and spray-granulation are performed. The spray-drying method is the method of atomizing the slurry in a hot wind to dry it. The apparatus used for the spray-drying method is a pin type atomizer. The pin type atomizer is one kind of centrifugal type atomizer using an atomizing board, and in the atomizing board, plural atomizing rollers are attached detachably between the upper and lower attachment disks on a roughly concentric circle along the circumference thereof. The slurry B is guided from the center of the atomizing board, and it adheres to the atomizing rollers by centrifugal force and moves outward on the roller surface, and finally it separates from the roller surface to atomize it.

Although the temperature of the slurry B to be atomized is usually the room temperature, it may be warmed to higher than the room temperature.

The hot wind temperature at the moment of spray-drying is usually from 80° C. to 250° C., and preferably from 100° C. to 200° C. In the spray-drying method, the method to blow a hot wind is not limited in particular, and for example, the method in which the hot wind and the direction of atomizing go in parallel in the transverse direction, the method in which atomizing is carried out in the drying column top part and the atomized droplet falls with the hot wind, the method in which the atomized droplet and the hot wind contact in countercurrent, the method in which the atomized droplet first goes in parallel with the hot wind, subsequently falls by gravity, and then contact the hot wind in countercurrent, and the like may be mentioned.

Carrying out the spray-drying of the slurry B to remove the solvent in the slurry can gives the composite particle comprising the electrode active material, the electric conductive material, the binder, and the soluble resin. In this composite particle, the electrode active material and the electric conductive material are bonded by the binder and/or the soluble resin, and the outer shell portion of the composite particle is formed by bonding the electrode active material and/or the electric conductive material whose weight average particle diameters are comparatively small, and the composite particle core portion is formed by bonding the electrode active material and/or the electric conductive material whose weight average particle diameters are comparatively large.

The electrochemical element electrode material according to the present invention comprises the composite particles according to the present invention, and it includes an additional binder and other additives at necessity.

The amount of the composite particles contained in the electrochemical element electrode material is usually 50% by weight or more, preferably 70% by weight or more, and further preferably 90% by weight or more.

As the additional binder contained if needed into the electrode material, those same as ones listed up as the binder used in obtaining the above composite particle may be mentioned. Since the above composite particle has already contained the binder, in preparing the electrode material, it is not necessary to add the binder separately, but in order to increase the bonding force of the composite particles, the binder may be added when the electrode material is prepared. The amount of the binder to be added when preparing the electrode material, in the sum total with the binder in the composite particles, and to 100 parts by weight of the electrode active material, is in the range of usually 0.001 to 50 parts by weight, preferably 0.01 to 20 parts by weight, and further preferably 0.1 to 10 parts by weight.

The other additives include forming auxiliary agents such as water and alcohol, and the quantity which does not spoil the effect of the present invention may be chosen appropriately and may be applied.

The electrochemical element electrode according to the present invention is made by laminating an active material layer made of the above electrochemical element electrode material on a collector.

As the material for the collector used in the present invention, for example, metal, carbon, conductive polymer, and the like may be used, and metal is used preferably. As the metal for the collector, aluminum, platinum, nickel, tantalum, titanium, stainless steel, and other alloy and the like are usually used. Among these, it is preferable to use aluminum or aluminum alloy from the viewpoint of conductivity and voltage resistance. Moreover, when high voltage resistance is required, the high purity aluminum disclosed in Japanese Unexamined Patent Application Publication No. 2001-176757 and the like may be used preferably. The collector is a film or a sheet, and although the thickness thereof is suitably chosen according to applications, it is usually from 1 μm to 200 μm, preferably from 5 μm to 100 μm, more preferably from 10 μm to 50 μm.

Although the active material layer may be fabricated by forming the electrochemical element electrode material into the shape of a sheet, and may be laminated subsequently onto the collector, meanwhile, it is preferable to fabricate the electrochemical element electrode material directly on the collector, and thereby form the active material layer. As the method of forming the active material layer which comprises the electrochemical element electrode material, although there are dry molding methods such as a pressure molding method, and wet molding methods such as an application method, the dry molding methods are preferable since the drying process is unnecessary and the producing cost can be reduced. As the dry molding methods, there are the pressure molding method, the extrusion molding method (referred to also as paste extrusion) and the like. The pressure molding method is the method where pressure is given to the electrochemical element electrode material, and thereby the material is made thickness by the re-arrangement, modification, and destruction of the electrode material, to form the active material layer. The extrusion molding method is the method where the electrochemical element electrode material is extruded by an extrusion molding machine into a film shape, a sheet shape and the like, and is the method that can continuously form the active material layer as a long object. Among these, it is preferable to use the pressure molding method since it can be made by simple equipment. As the pressure molding method, for example, there are the method where the electrode material containing composite particles are supplied to a roll pressure molding apparatus by a feeder such as a screw feeder, and the active material layer is formed (in this method, the active material layers can be directly laminated on the collector by sending the collector between the roll at the same time when the electrode material is supplied); the method where the electrode material is spread on the collector, and the electrode material is leveled by a blade or the like, and its thickness is adjusted, then it is formed by a pressure molding apparatus; the method where the electrode material is filled up in cavity of a mold and the mold is pressurized and formation is made, and so on. It is preferable that the temperature at the moment of molding is from 0° C. to 200° C.

In order to eliminate uneven thickness of the formed electrode, and to increase the density of the active material layer and to achieve high capacitance, post-pressing may be performed further if needed. As the method of post-pressing, press process by a roll is generally performed. In the roll press process, two cylindrical rolls are arranged vertically in parallel with each other with a narrow interval, and they are rotated in opposite directions, and an electrode is inserted into them to be pressurized. The temperature of the roll may be adjusted by heating or cooling.

EXAMPLE

The present invention is explained still more specifically with reference to Examples and Comparative Examples hereafter, however, the present invention is not limited to the following Examples. Moreover, part and % are by weight, unless otherwise specified.

Example 1

100 parts of electrode active material (activated carbon having specific surface area of 2000 $m^2/g$ and weight average particle diameter of 5 μm), 5 parts of electric conductive material (acetylene black "Denka Black Powder": manufactured by Denki Kagaku Kogyo K.K.), 7.5 parts of dispersible binder (aqueous dispersion of cross-linked acrylate polymer with average particle diameter of 0.15 μm, and glass transition temperature of −40° C.: "AD211": manufactured by Zeon Corporation), 93.3 parts of soluble resin (1.5% aqueous solution of carboxymethyl cellulose "DN-800H": manufactured by Daicel Chemical. Industries, Ltd.), and 341.3 parts of ion exchanged water were stirred and mixed by a TK homomixer to obtain slurry having solid content of 20%. Subsequently, the slurry was charged into a hopper 51 of a spray drier (with a pin type atomizer, manufactured by Ohkawara Kakohki Co. Ltd.) as shown in FIG. 5, and sent to the top nozzle 57 with pump 52, and sprayed from the nozzle into the drying column 58. At the same time, 150° C. hot wind was sent into the drying column 58 from the side of the nozzle 57 through the heat exchanger 55 to obtain a spherical composite particle A-1 having particle diameter of 10 μm to 100 μm (average particle diameter of 50 μm.) The electron microscope observation image of the obtained composite particle was shown in FIG. 6. The composite particle A-1 consisted of a core portion and an outer shell portion, and in the core portion, the shapes of particles having large particle diameter can be found, while, in the outer shell portion, fine particles whose individual shape cannot be found were bonded mutually. That is, the weight average particle diameter of the electrode active material and the electric conductive material which form the outer shell portion, was smaller than the weight average particle diameter of the electrode active material and the electric conductive material which form the core portion.

The obtained composite particle 3, as shown in FIG. 4, was supplied from the feeder 4 into the roll 5 (roll temperature 100° C., line pressure 3.9 kN/cm) in a roll pressing machine (pushing cut rough surface heat roll; manufactured by Hirano Engineering Research Institute Ltd.), and was formed on an aluminum collector 1 having thickness of 40 μm at molding rate 3.0 m/min to give an electrode sheet which has an active material layer 2 with thickness of 350 μm, width of 10 cm, and density of 0.58 $g/cm^3$. The capacitor characteristics of this electrode sheet were shown in Table 1.

Example 2

Slurry was obtained in the same manner as in the Example 1 except that 5.6 parts of polytetrafluoroethylene were used in the place of the binder (AD-211) used in the Example 1, and by use of this slurry, a spherical composite particle A-2 of particle diameter 5 μm to 70 μm (average particle diameter of 50 μm) was obtained. The composite particle A-2 consisted of a core portion and an outer shell portion in the same manner as the composite particle A-1, and the weight average particle diameter of the electrode active material and the electric conductive material which form the outer shell portion, was smaller than the weight average particle diameter of the electrode active material and the electric conductive material which form the core portion, and had the same structure as that of the particles as shown in FIG. 3.

The obtained composite particle was rolled and formed by use of the roll pressing machine in the same manner in the Example 1, and an electrode sheet having an active material layer which had thickness of 380 μm, width of 10 cm, and density of 0.59 $g/cm^3$ was obtained. The capacitor characteristics of this electrode sheet were shown in Table 1.

Example 3

Slurry S1 (solid content 8%) made of 2 parts ot an electric conductive material (Denka Black Powder: manufactured by Denki Kagaku Kogyo), 7.5parts (solid content 40%) of a binder (AD211: manufactured by Zeon Corporation), 3.33 parts (solid content 4%) of carboxymethyl cellulose ("DN-10L" manutacturedby Daicel Chemical Industries, Ltd.), 17.76 parts (solid content 1.5%) of carboxymethyl cellulose ("DN-800H" manufactured by Daicel Chemical Industries, Ltd.), and 36.9 parts of ion exchanged water was prepared.

100 parts of an electrode active material (activated carbon having specific surface area of 2000 $m^2/g$ and weight average particle diameter of 5 μm) was charged into an Agglomaster manufactured by Hosokawa Micron Corp., and it was fluidized by 80° C. hot wind, and the above slurry S1 was atomized into the Agglomaster, and fluidized-granulation was performed to give a particle A. The average particle diameter of the particle A was 40 μm.

Slurry S2 (solid content 10.9%) made of 3 parts of an electric conductive material (Denka Black Powder: manufactured by Denki Kagaku Kogyo), 0.625 part (solid content 40%) of a binder (AD211: manufactured by Zeon Corporation), 5.0 parts (solid content 4%) of carboxymethyl cellulose ("DN-10L" manufactured by Daicel Chemical Industries, Ltd.), and 26.64 parts (solid content 1.5%) of carboxymethyl cellulose ("DN-800H" manufactured by Daicel Chemical Industries, Ltd.) was prepared.

The particles A were charged into a rolling-fluidized granulating machine (Henschel Mixer), and it was rolling-fluidized granulated while the slurry S2 was atomized to obtain composite particle A-3. This composite particle was spherical and its average particle diameter was 50 μm. The composite particle A-3 consisted of a core portion and an outer shell portion, and the weight average particle diameter of the electrode active material and the electric conductive material which form the outer shell portion was smaller than the weight average particle diameter of the electrode active material and the electric conductive material which form the core portion.

The obtained composite particle A-3 was rolled and formed by use of the roll pressing machine in tho same manner in the Example 1, and an electrode sheet having an active material layer which had thickness of 350 μm, width of 10 cm, and density of 0.57 g/cm³ was obtained. The capacitor characteristics of this electrode sheet were shown in Table 1.

Comparative Example 1

The particles A obtained in the intermediate process of the Example 3 were particles having a structure where only the electric conductive material adhered to the surroundings of the electrode active material, and was not of a 2-layer structure of a core portion and an outer shell portion.

Although this particle A was tried to be rolled and formed by use of the roll pressing machine in the same manner in the Example 1, it was not possible to perform formation.

Comparative Example 2

In the Comparative Example 1, roll forming was carried out in the same manner as the Comparative Example 1 except that the line pressure of the roll was changed into 9.8 kN/cm, and the molding rate was changed into 0.5 m/min, and an electrode sheet which had an active material layer with thickness of 320 μm, width of 10 cm, and density of 0.59 g/cm³ was obtained. The capacitor characteristics of this electrode sheet were shown in Table 1.

TABLE 1

| | Electrode density [g/cm³] | Active material layer thickness [μm] | Capacitance [F/g] | Internal resistance [Ω] |
|---|---|---|---|---|
| Example 1 | 0.58 | 350 | 54.6 | 12.2 |
| Example 2 | 0.59 | 380 | 53.4 | 11.9 |
| Example 3 | 0.57 | 350 | 54.5 | 9.8 |
| Comparative Example 1 | | Impossible to form | | |
| Comparative Example 2 | 0.59 | 320 | 46.2 | 13.2 |

Evaluation Method of Capacitor Characteristics
(Electrode Density)

An electrode of a size 40 mm×60 mm is cut down from the electrode sheet, the weight and volume of the electrode were measured, and the electrode density excluding the collector portion was calculated.

(Capacity and Internal Resistance)

The electrode sheet was punched out to obtain two circular electrodes with diameter 12 mm. The active material layers of the electrodes were opposed each other, and a rayon separator of thickness 35 μm was inserted thereinto. To this, electrolysis solution in which triethylmonomethylammonium tetrafluoroborate was dissolved into propylene carbonate at concentration of 1.5 mol/L was impregnated under decompression to give a coin cell CR2032 type electric double layer capacitor.

The obtained electric double layer capacitor was used, and it was charged at 25° C. for 10 minutes at constant current 10 mA from 0V to 2.7V, and then to 0V, it was discharged at fixed current 10 mA. From the obtained charge-discharge curve, capacitance was calculated, and it was divided by the mass of only the active material layer of the above electrode to give the capacitance per unit mass of the active material layer. Moreover, the internal resistance was calculated from the charge-discharge curve according to the calculation method of the standard RC-2377 specified by the Japan Electronics and Information Technology Industries Association.

As is apparent from the above Examples and Comparative Examples, when the electrochemical element electrode material that comprises the composite particle according to the present invention that includes a core portion and an outer shell portion, where the weight average particle diameter of the electrode active material and the electric conductive material which form the outer shell portion is smaller than the weight average particle diameter of the electrode active material and the electric conductive material which form the core portion, it is possible to obtain electrodes for electric double layer capacitors with a high electrode density. Moreover, when the obtained electrodes is used, it is possible to produce electric double layer capacitors with low internal resistance and large electric capacitance.

On the other hand, it is known that with composite particles where large particles and small particles are distributed uniformly, and composite particles of the structure where only the electric conductive material is adhered to the electrode active material, the internal resistance does not become low enough, but the capacitance is low.

Industrial Applicability

Use of the electrochemical element electrode obtained in this manner result in producing an electrochemical element with low internal resistance and high electric capacitance, which allows it to be used preferably for various applications including backup power sources of memories in personal computers or personal digital assistants, power sources for instantaneous power failure measures in personal computers and the like, applications to electric cars or hybrid cars, solar power generation energy storage systems used together with solar cells, load leveling power sources combined with batteries and the like.

The invention claimed is:

1. A composite particle for electrochemical element electrode, comprising electrode active materials, electric conductive materials and binders, and being structured of an outer layer portion and an inner layer portion; wherein the outer layer portion and the inner layer portion are made by bonding the electrode active materials and the electric conductive materials by the binders, and the weight average particle diameter of, the electrode active material and the electric conductive material which form the outer layer portion, is smaller than the weight average particle diameter of, the electrode active material and the electric conductive material which form the inner layer portion.

2. The composite particle for electrochemical element electrode according to claim 1, wherein the binders are a dispersible binder.

3. The composite particle for electrochemical element electrode according to claim 1, wherein the electrode active materials are activated carbons having a specific surface area of 30 m²/g or higher.

4. The composite particle for electrochemical, element electrode according to claim 2, wherein the dispersible binder are acrylate polymers.

5. The composite particle for electrochemical element electrode according to claim 2, wherein the dispersible binders are polytetrafluoroethylene.

6. The composite particle for electrochemical element electrode according to claim 2, further comprising a soluble resin.

7. An electrochemical element electrode material comprising the composite particle according to claim 1.

8. An electrochemical element electrode wherein an active material layer made of the electrochemical element electrode material according to claim 7 is laminated on a collector.

9. An electrochemical element electrode according to claim 8, which is for an electric double layer capacitor.

* * * * *